Feb. 21, 1967     C. M. MULLIS ET AL     3,305,064
BRAKING DEVICES
Filed Dec. 12, 1962
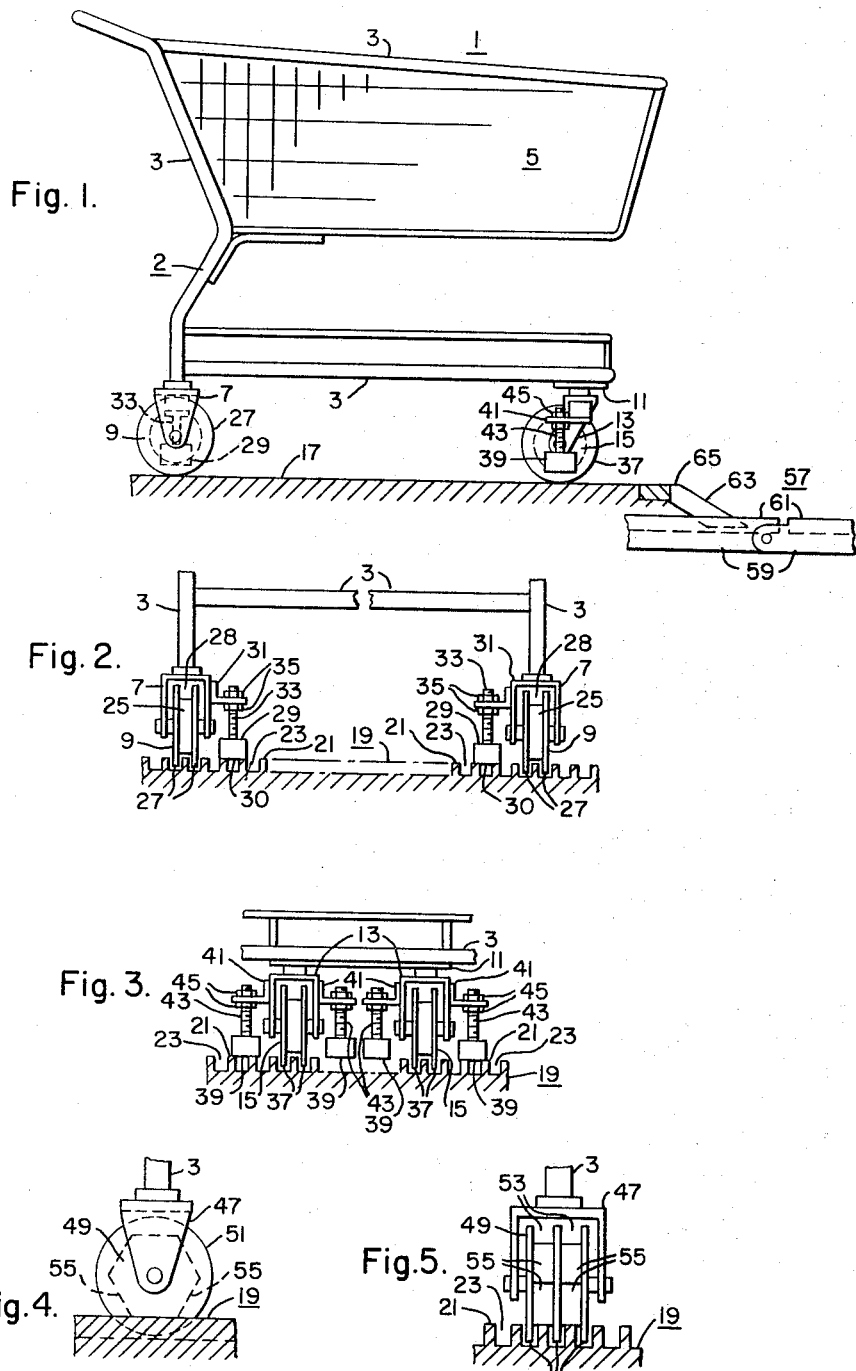
WITNESSES:
Bernard R. Giegner
James F. Young
INVENTORS
Clyde M. Mullis and
Larry P. Tosato.
BY J. J. Reisman
ATTORNEY

United States Patent Office 3,305,064
Patented Feb. 21, 1967

3,305,064
BRAKING DEVICES
Clyde M. Mullis, Glen Rock, and Larry P. Tosato, Bayonne, N.J., assignors to Westinghouse Electric Corporation, East Pittsburgh, Pa., a corporation of Pennsylvania
Filed Dec. 12, 1962, Ser. No. 244,199
27 Claims. (Cl. 198—16)

This invention relates to braking devices, and it has particular relation to braking means for structures adapted to be carried by cleated surfaces.

An example of such a cleated surface is the load carrying surface or treadway of a modern moving walk, whose load transporting run may have both horizontal and inclined portions. A passenger disposed to be conveyed by such a moving walk may be accompanied by a wheel-supported structure, as by a baby carriage or stroller or, particularly in the vicinity of a store such as a supermarket, by a shopping or stocking cart. In such event, it is desirable to prevent rolling of the structure while it is located on the moving walk, preferably with minimum modification to the structure itself.

In accordance with the invention, a wheel-supported structure is provided with means for automatically braking the structure when it is located on a cleated surface. For this purpose, each of one or more of the wheels of the structure is provided with at least one peripheral cleat for intermeshing with a portion of the cleats of the cleated surface. Upon the occurrence of such intermesh, the structure occupies a lower position than otherwise is the case, and one or more frictional braking surfaces carried by the structure automatically engage the cleated surface for restraining further movement of the structure relative thereto.

In one aspect of the invention, each braking surface is the lowermost surface of a braking pad, which may be located adjacent each cleated wheel. In another aspect of the invention, each braking surface is integral with each cleated wheel.

It is, therefore, an object of the invention to provide improved braking means for a structure that is to be carried by a cleated surface.

It is another object of the invention to provide structure braking mechanism which automatically becomes effective when the structure is disposed on a cleated surface.

It is a further object of the invention to provide one or more wheels of a wheel-supported structure with peripheral cleats for intermeshing with the cleats of a cleated surface which carries the structure and means mounted on the structure for automatically braking the structure upon occurrence of such intermesh.

Other objects of the invention will be apparent from the following description taken in conjunction with the accompanying drawings, in which:

FIGURE 1 is a view in side elevation of a shopping cart embodying one form of the invention;

FIG. 2 is a rear view, with parts broken away and parts not shown, of the shopping cart of FIG. 1 disposed on a cleated surface;

FIG. 3 is a front view, with parts broken away and parts not shown, of the shopping cart of FIG. 1 disposed on a cleated surface;

FIG. 4 is a side view of a shopping cart wheel disposed on a cleated surface and embodying another form of the invention; and FIG. 5 is an end view of the embodiment of the invention shown in FIG. 4.

Referring to the drawing, FIGS. 1, 2 and 3 illustrate a shopping cart 1 having a frame 2 comprising frame members 3 for supporting a basket 5. Mounted to the bottom of the frame for rotation about a common axis by means of a pair of fixed U-shaped axle support members 7 are a pair of rear wheels 9. A front plate 11 secured to the bottom of the frame 2 mounts a pair of U-shaped swivel axle support members 13 for a pair of front wheels 15, the members 13 and the wheels 15 constituting casters. The general construction of such carts is well known and it appears unnecessary to describe it further.

In FIG. 1, the cart 1 is disposed on a portion of a smooth surface 17 such as the floor of a supermarket, wherein it may be pushed along in the normal manner, while in FIGS. 2 and 3, the cart is shown to be carried by a portion of a surface 19 formed of uniform and parallel cleats 21, which alternate with uniform grooves 23. The cleated surface 19 may represent, for example, an extension of the surface 17 adjacent an exit of a supermarket, or it may represent the load carrying surface or treadway of a moving walk which is disposed for uniform movement in a direction parallel to its cleats. While such a treadway may be constructed of a flexible material such as rubber, preferably it is fabricated of metal, e.g., aluminum or steel. Although the surface 19 may be horizontal, it also will be understood that it may be inclined.

One or more of the cart wheels include means for restraining movement of the cart relative to the cleats 21. Thus, as is shown clearly in FIGS. 1 and 2, each of the rear wheels 9, which may be fabricated of a relatively hard material having suitable wearing properties such as a phenolic resin, comprises a hub 25, on which is formed a pair of peripheral cleats 27, the cleats 27 having a larger outside diameter than the hub 25 to form a peripheral groove 28 therebetween. The cleats 27 are spaced by the groove 28 and proportioned such that they may intermesh loosely with adjacent ones of the cleats 21. It will be apparent that upon occurrence of such intermesh, the cart 1 occupies a lower position than otherwise is the case, as when it is disposed on the smooth surface 17 and the outermost surfaces of the cleats 27 bear the load of the cart and its contents, if any.

Inwardly adjacent each of the rear wheels 9 is a pad 29. If the cleated surface 19 is metallic, the pads 29 preferably are formed of friction braking material such as rubber. Conversely, if the surface 19 is fabricated of rubber, the pads may be metallic. Inasmuch as the former construction is preferred, it will be assumed that such is the case.

Each of the brake pads 29 may be secured to the adjacent cart frame member 3, but conveniently it may be mounted as by means of a bracket 31 on the associated wheel axle support member 7. It will be observed that each pad is so positioned that its bottom surface 30 engages a portion of the cleated surface 19 when the peripheral cleats 27 of its associated wheel intermesh with a portion of the cleats 21 as aforesaid. Although each of the pads 29 may be configured to contact only one of the cleats 21, preferably the bottom surface of each pad is flat and is proportioned to engage a plurality of such cleats for a number of reasons such as minimizing pad wear and providing smoother operation.

In order for the brake pads 29 to achieve maximum braking efficiency the peripheral wheel cleats 27 should be prevented from touching the bottoms of the grooves 23 within which they are located, and the top surface of each cleat 21 which is disposed within one of the peripheral wheel grooves 28 should be prohibited from engaging the associated hub 25. For this purpose, each pad may be fixedly mounted in the correct position on its bracket 31, but to provide for slight variations in the sizes of the parts and for wear and tear thereon, each pad conveniently is adjustable vertically, as by means of a threaded stud 33 and a pair of locking nuts 35.

Although each of the brake pads 29 in FIGS. 1 and 2 is in vertical alignment with the axis of rotation of its associated rear wheel 9, it will be understood that if desired each pad may be disposed rearwardly or forwardly of such axis. In addition, although a separate brake pad is shown to be associated with each of the rear wheels, it will be apparent that a single pad may be employed for both wheels. For example, the pads 29 may be extended all the way across the space therebetween in FIG. 2 to form a single long pad. In the latter instance, however, the single pad would prevent the "nesting" of adjacent carts in the normal manner, whereas with the configuration presently illustrated in FIG. 2, the contrary is the case.

For braking the cart 1 on a horizontal cleated surface, it may be sufficient to provide peripheral cleats and a brake pad or pads for only the rear wheels thereof. Additional braking force may be required, however, when the cart is located on an inclined cleated surface to insure that it remains stationary with respect thereto. For this purpose, each of the front wheels 15 also may be provided with peripheral cleats 37 similar to the cleats 27 for the rear wheels 9, as is shown more clearly in FIG. 3. Preferably, front brake pads 39 similar to the rear pads 29 are mounted, as by means of brackets 41, threaded adjusting studs 43 and locking nuts 45, on the swivel axle support members 13 rather than on the adjacent cart frame member or members 3 or on the swivel support plate 11 so that the pads 39 may rotate with the casters. Otherwise, the pads 39 must be spaced from the casters sufficiently to permit full rotation thereof without interference, thus taking up more space.

In order to provide balanced braking forces for the front casters when the cart is braked and thus to prevent a tendency for the casters to rotate and thereby to effect demeshing of the wheel and load carrying surface cleats, each of the casters has an inwardly and an outwardly disposed brake pad 39. It will be understood by inspection of the drawing and from the preceding discussion that the front brake pads operate similarly to the rear brake pads for restraining movement of the cart 1 relative to the cleated surface 19.

In the embodiment of FIGS. 4 and 5, a shopping cart rear wheel U-shaped support member 47 mounts a wheel 49 for rotation about its axis. As is shown, the wheel 49 has three peripheral cleats 51, which may be fabricated of a relatively hard material such as a phenolic resin. Between each pair of adjacent ones of the cleats 51 is a groove 53. Each hub portion of the wheel between adjacent peripheral cleats 51, however, is not round, as in the embodiment of FIGS. 2 and 3, but has a non-cylindrical shape. Desirably such shape is polygonal. As is illustrated in FIGS. 4 and 5, for example, each of these hub portions has six flat outer surfaces 55 symmetrically disposed about the axis of the rotation of the wheel.

The hub portions of the wheel 49 are so proportioned that when the wheel cleats 51 intermesh with a portion of the load carrying surface cleats 21 and each of a pair of the surfaces 55 contacts the top surface of that cleat 21 disposed between the adjacent wheel cleats 51, the outer surfaces of the wheel cleats preferably are prevented from touching the bottoms of the respective associated grooves 23. Thus, the wheel cannot rotate, and this in addition to the friction between the engaged hub and load carrying cleat surfaces restrains movement of the shopping cart relative to the cleats 21.

Although the wheel 49 may be constructed of one piece, it also may be of non-unitary construction, in which case the several pieces may be keyed in a well known manner on the shaft of the wheel to preclude relative rotation thereof. For maximizing the braking force, each polygonal wheel hub portion may be fabricated of or have an outer layer of friction braking material such as rubber.

It will be understood that not only may the rear wheels of the cart be configured as in FIGS. 4 and 5, but also the front wheels thereof may be so configured to provide additional braking force if desired. It also will be apparent that when the wheel 49 is located on a smooth surface such as the surface 17 of FIG. 1, the outermost surfaces of its cleats 51 bear the load of the shopping cart and its contents, if any.

Notwithstanding that the cleated wheels described herein have two or three peripheral cleats, as the case may be, it should be noted that each of such wheels may have a greater number of cleats or as few as one peripheral cleat to accomplish braking of the cart in either of the manners discussed. A plurality of cleats are deemed desirable, however, in order to minimize the effect of surface irregularities when the cart is disposed on a non-cleated surface and to decrease the load on each cleat, thus reducing cleat wear and tear.

A modern moving walk having a cleated treadway preferably is provided with a comb plate at each landing thereof. Each comb plate has teeth which intermesh with the cleats of the treadway. Such teeth have top surfaces which rise from a position wholly within the treadway grooves to a position above the cleats thereof in order to comb-out objects which may be disposed between the cleats and to provide for a smooth transfer of load between the moving walk and the associated landing. In addition, while aspects of the invention may be utilized in transportation systems having cleated moving walks constructed of flexible material, they are especially desirable when employed in systems embodying cleated metallic walks of rigid construction, and more particularly articulated or pelletized moving walks. Referring to FIG. 1, for example, a portion of such a moving walk is illustrated schematically at the right-hand end of the non-cleated surface 17. The walk 57 comprises an articulated belt formed of an endless series of rigid metallic platforms or pallets 59. Each platform has a plurality of load carrying parallel spaced cleats 61 running in the direction of belt travel. These cleats intermesh with teeth 63 of a landing comb plate 65 as the associated platform passes under the comb plate. For a more complete description of this type of moving walk, reference may be made to the copending application of Lennius R. Rissler and Clyde M. Mullis, Serial No. 200,499, filed June 6, 1962, and assigned to the same assignee as the present application. Thus, if the cart 1 is being transported by such a moving walk and if it is braked in either of the manners described above, when it arrives at the exit landing of the walk the teeth of the landing comb plate comb the cart wheel cleats from between the treadway cleats and disengage the cart braking surfaces from the walk treadway, thereby terminating the braking of the cart and allowing it to be pushed in the normal manner.

Although the invention has been described with reference to certain specific embodiments thereof, numerous modifications falling within the spirit and scope of the invention are possible.

We claim as our invention:

1. In a structure adapted to be carried by a plurality of spaced first cleats, a wheel for supporting said structure, means mounting said wheel on said structure for rotation about its axis, said wheel having a plurality of similar circumferential ribs concentric about said axis adjacent ribs being separated by a continuous groove, said ribs being adapted to intermesh with adjacent first cleats, and braking means automatically engaging a part of said first cleats upon occurrence of such intermesh for restraining movement of said structure relative to said first cleats, said braking means having a braking surface spaced above the lowest point on said wheel by a distance less than the depth of said groove.

2. In a structure adapted to be carried by a plurality of spaced first cleats, a wheel for supporting said structure, means mounting said wheel on said structure for rotation about its axis, said wheel having a peripheral thickness less than the spacing between adjacent ones of said first cleats and adapted to intermesh with such adjacent first cleats, and a brake supported by said structure and disposed automatically to engage frictionally the uppermost surface of at least one of said first cleats upon occurrence of such intermesh for restraining movement of said structure relative to said first cleats, said brake being positioned above the level of lowest surface of said wheel, whereby the brake clears a plane surface over which the wheel is moved.

3. In combination, a plurality of spaced first cleats, a structure adapted to be carried by a plurality of said spaced first cleats, a wheel for supporting said structure, mounting means mounting said wheel on said structure for rotation about the axis of said wheel, said wheel having at least one peripheral cleat adapted to intermesh with a portion of said first cleats, said structure occupying a lower position when said first and peripheral cleats are so intermeshed and a higher position in the absence of such intermesh, and a brake mounted adjacent said wheel, said brake being proportioned automatically to engage the uppermost surface of at least one of said first cleats when said first and peripheral cleats are so intermeshed and said structure occupies said lower position for restraining movement of said structure relative to said first cleats, said brake being positioned to clear said first cleats when the structure occupies said higher position.

4. In combination, a plurality of spaced metallic first cleats, a structure adapted to be carried by a plurality and of said spaced metallic first cleats, a wheel for supporting said structure, mounting means mounting said wheel on said structure for rotation about the axis of said wheel, said wheel having a plurality of similar circumferential ribs concentric about said axis adjacent ribs being separated by a continuous groove, said ribs being adapted to intermesh with a portion of said first cleats, said structure occupying a lower position when said first and circumferential ribs are so intermeshed than in the absence of such intermesh, and a brake of material having substantial friction with respect to said first cleats mounted adjacent said wheel, said brake having a bottom surface positioned above a horizontal plane containing the lowest point of said wheel by a distance less than the depth of said groove, whereby said bottom surface is disposed automatically to engage the uppermost surface of at least one of said first cleats when said first and peripheral cleats are so intermeshed and said structure occupies said lower position for restraining movement of said structure relative to said first cleats.

5. In a structure adapted to be carried by a plurality of spaced metallic first cleats, a pair of spaced wheels for supporting said structure, mounting means mounting said wheels on said structure for rotation about a common axis, each of said wheels having a peripheral thickness less than the spacing between adjacent ones of said first cleats and adapted to intermesh with such adjacent first cleats, said wheel mounting means positioning said wheels to permit the simultaneous intermesh of both of said wheels with said first cleats, said structure occupying a lower position when said peripheral and adjacent first cleats are so intermeshed and a higher position in the absence of such intermesh, and a separate brake mounted adjacent each of said wheels, each of said brakes being of material having substantial friction with respect to said first cleats and having a bottom surface disposed and porportioned automatically to engage the uppermost surfaces of a plurality of said first cleats when said first and peripheral cleats are so intermeshed and said structure occupies said lower position for restraining movement of said structure relative to said first cleats, said brakes being positioned to clear said first cleats when the structure occupies said higher position.

6. In combination, a plurality of spaced metallic first cleats, a structure adapted to be carried by a plurality of said spaced metallic first cleats, a pair of spaced wheels for supporting said structure, mounting means mounting said wheels on said structure for rotation about a common axis, each of said wheels having a peripheral thickness less than the spacing between adjacent ones of said first cleats and adapted to intermesh with such adjacent first cleats, said wheel mounting means positioning said wheels to permit the simultaneous intermesh of both of said wheels with said first cleats, said structure occupying a lower position when said peripheral and adjacent first cleats are so intermeshed and a higher position in the absence of such intermesh, and a separate brake mounted adjacent each of said wheels, each of said brakes being of material having substantial friction with respect to said first cleats and having a bottom surface disposed and proportioned automatically to engage the uppermost surfaces of a plurality of said first cleats when said first and peripheral cleats are so intermeshed and said structure occupies said lower position for restraining movement of said structure relative to said first cleats, said brakes being positioned to clear said first cleats when the structure occupies said higher position, said structure being constructed and said brakes being disposed and proportioned to permit the nesting of said structure with a like structure between said wheels.

7. In a structure adapted to be carried by a plurality of uniform, parallel and equally-spaced first cleats, a plurality of wheels for supporting said structure, mounting means mounting each of said wheels on said structure for rotation about the respective axes of said wheels, at least a portion of said mounting means for a corresponding portion of said wheels comprising swivel means to constitute casters, each of said wheels having at least one peripheral cleat adapted to intermesh with a portion of said first cleats, said wheel mounting means positioning said wheels to permit the intermesh of all of said peripheral cleats simultaneously with such portions of said first cleats, said structure occupying a lower position when said first and peripheral cleats are so intermeshed and a higher position in the absence of such intermesh, a separate friction brake disposed adjacent each of said wheels, and means mounting the portion of said brakes associated with said casters on the respective associated swivel means, each of said brakes being proportioned automatically to engage the uppermost surfaces of a plurality of said first cleats when said first and peripheral cleats are so intermeshed and said structure occupies said lower position for restraining movement of said structure relative to said first cleats, said brakes being positioned to clear said first cleats when the structure occupies said higher position.

8. In a structure adapted to be carried by a plurality of uniform, parallel and equally-spaced first cleats, a plurality of wheels for supporting said structure, mounting means mounting each of said wheels on said structure for rotation about the respective axes of said wheels, a portion of said mounting means for a corresponding portion of said wheels comprising swivel means to constitute casters, each of said wheels having at least one peripheral cleat adapted to intermesh with a portion of said first cleats, said wheel mounting means positioning said wheels to permit the intermesh of all of said peripheral cleats simultaneously with such portions of said first cleats, said structure occupying a lower position when said first and peripheral cleats are so intermeshed and a higher position in the absence of such intermesh, a separate friction brake disposed adjacent each of said wheels without swivel means, a separate friction brake disposed on each side of each of said casters, and means mounting the portion of said brakes associated with said casters on the respective associated swivel means, each of said brakes being proportioned automatically to engage the uppermost surfaces of a plurality of said first cleats when said first and peripheral cleats are so intermeshed and said structure occupies said lower position for restraining movement of said structure relative to said first cleats, said brakes being positioned to clear said first cleats when the structure occupies said higher position.

9. In a structure adapted to be carried by a plurality of spaced first cleats, a wheel for supporting said structure, means mounting said wheel on said structure for rotation about its axis, said wheel having at least one peripheral cleat adapted to intermesh with a portion of said first cleats, and brake means automatically engaging a part of said first cleats when said first and peripheral cleats are so intermeshed for preventing rotation of said wheel to restrain movement of said structure relative to said first cleats, said brake being positioned above the level of lowest surface of said wheel, whereby the brake clears a plane surface over which the wheel is moved.

10. In a structure adapted to be carried by a plurality of spaced first cleats, a wheel for supporting said structure, mounting means mounting said wheel on said structure for rotation about the axis of said wheel, said wheel having at least one peripheral cleat adapted to intermesh with a portion of said first cleats, said structure occupying a lower position when said first and peripheral cleats are so intermeshed and a higher position in the absence of such intermesh, said wheel also having a non-cylindrical surface adjacent said peripheral cleat, said non-cylindrical surface being spaced radially from the axis of rotation of said wheel by a distance less than the outermost radius of said peripheral cleat but by a distance sufficient to effect engagement of such surface with the uppermost surface of at least one of said first cleats when said first and peripheral cleats are so intermeshed and said structure occupies said lower position for preventing rotation of said wheel and for restraining movement of said structure relative to said first cleats, all parts of said non-cylindrical surface being sufficiently close to said axis to permit free rotation of the wheel over a plane surface.

11. In a structure adapted to be carried by a plurality of spaced first cleats, a wheel for supporting said structure, mounting means mounting said wheel on said structure for rotation about the axis of said wheel, said wheel having at least one peripheral cleat adapted to intermesh with a portion of said first cleats, said structure occupying a lower position when said first and peripheral cleats are so intermeshed than in the absence of such intermesh, said wheel also having a flat braking surface adjacent said peripheral cleat, said flat surface being spaced radially from the axis of rotation of said wheel by a distance less than the outermost radius of said peripheral cleat but by a distance sufficient to effect engagement of said flat surface with the uppermost surface of at least one of said first cleats when said first and peripheral cleats are so intermeshed and said structure occupies said lower position for preventing rotation of said wheel and for restraining movement of said structure relative to said first cleats.

12. In a structure adapted to be carried by a plurality of uniform, parallel and equally-spaced first cleats, a pair of front wheels and a pair of rear wheels for supporting said structure, mounting means mounting each of said wheels on said structure for rotation about the respective axes of said wheels, each of the wheels of at least one of said pairs having a plurality of uniform peripheral cleats adapted to intermesh with a portion of said first cleats, said wheel mounting means positioning said wheels to permit the intermesh of all of said peripheral cleats simultaneously with such portions of said first cleats, said structure occupying a lower position when said first and peripheral cleats are so intermeshed than in the absence of such intermesh, each of said wheels of said one pair also having a plurality of flat friction braking surfaces polygonally and symmetrically disposed about the axis of rotation of the associated wheel and positioned between adjacent ones of the associated peripheral cleats, each of said flat surfaces being spaced radially from the associated axis of rotation by a distance less than the outermost radius of the associated adjacent peripheral cleats but by a distance sufficient to effect engagement of such flat surface with the uppermost surface of at least one of said first cleats when said first and peripheral cleats are so intermeshed and said structure occupies said lower position for preventing rotation of the associated wheel and for restraining movement of said structure relative to said first cleats.

13. In a transportation system, a belt having a plurality of spaced, parallel and longitudinally extending rigid metallic first cleats for carrying load disposed on said first cleats from a first to a second station, means mounting said belt for movement between said stations in a direction parallel to said first cleats, a structure adapted to be carried by said first cleats, a wheel for supporting said structure, means mounting said wheel on said structure for rotation about its axis, said wheel having a peripheral thickness less than the spacing between adjacent ones of said first cleats and adapted to intermesh with such adjacent first cleats, said structure occupying a lower position when said peripheral and adjacent first cleats are so intermeshed and a higher position in the absence of such intermesh, and a member having a braking surface carried by said structure, said braking surface being formed of material having substantial friction with respect to said first cleats and being disposed automatically to be lowered into braking engagement with the uppermost surface of at least one of said first cleats when said peripheral and adjacent first cleats are so intermeshed and said structure occupies said lower position for restraining movement of said structure relative to said belt, said braking surface being spaced above a horizontal plane on which said wheel rests to permit rotational movement of the wheel along said plane.

14. In a transportation system, an articulated belt having a load transporting run and a return run and comprising an endless series of rigid metallic platforms, each of said platforms having a plurality of equally-spaced, uniform, parallel and longitudinally-extending first cleats for carrying load disposed on said first cleats from a first to a second landing, the cleats of each platform being aligned with the cleats of each of the other platforms, means mounting said belt for movement in a closed path in a direction parallel to said first cleats with the load transporting run of said belt extending between said landings, a structure adapted to be carried by said first cleats, a plurality of wheels for supporting said structure, mounting means mounting each of said wheels on said structure for rotation about the respective axes of said wheels, each of said wheels having a plurality of uniform peripheral cleats adapted to intermesh with a portion of said first cleats, said wheel mounting means positioning said wheels to permit the intermesh of all of said peripheral cleats simultaneously with such portions of said first cleats, said structure occupying a lower position when said first and peripheral cleats are so intermeshed and a higher position in the absence of such intermesh, a separate brake disposed adjacent each of said wheels, each of said brakes having a flat lower surface formed of material having substantial friction with respect to said first cleats and disposed and proportioned automatically to be lowered into engagement with the uppermost surfaces of a plurality of said first cleats when said peripheral and first cleats are so intermeshed and said structure occupies said lower position for restraining movement of said structure relative to said belt, and a comb plate disposed at said second landing, said comb plate having a plurality of teeth adapted to intermesh with said first cleats, the uppermost surfaces of said teeth rising from a position wholly within the spaces between said first cleats to a position above said first cleats for combing said peripheral cleats from between said first cleats to raise said structure to a position disengaging said brake lower surface from said first cleats as said structure arrives at said second landing.

15. The method of transporting from a smooth surface a structure having a wheel in engagement with said surface and having a brake positioned above said surface by a predetermined distance to a cleated surface having cleats rising vertically from a surface for a distance greater than said predetermined distance and proportioned to receive said wheel between said cleats which comprises moving said structure over said smooth surface, guiding said structure onto said cleated surface, positioning said wheel for reception by said cleats, and lowering said structure through said predetermined distance to bring said brake into engagement with the upper surfaces of said cleats for restraining further movement of said structure relative thereto.

16. The method of transporting from a smooth surface a structure including a plurality of wheels having peripheral cleats in engagement with said surface and a brake positioned above said surface by a predetermined distance to a cleated surface having cleats rising vertically from a surface for a distance greater than said predetermined distance and proportioned to receive said peripheral cleats therebetween which comprises moving said structure over said smooth surface, guiding said structure onto said cleated surface, positioning said wheels for reception of said peripheral cleats by said surface cleats, lowering said structure through said predetermined distance to bring said brake into engagement with the upper faces of said surface cleats for restraining further movement of said structure relative thereto, engaging each of said wheels at a point radially inward of the outer periphery thereof for the purpose of lifting such wheel sufficiently to disengage said brake from said surface cleats, and thereafter propelling the structure in a generally horizontal direction.

17. In a structure adapted to be carried by a supporting surface including a plurality of first cleats, a frame unit, and wheel means mounting said frame unit for movement over a supporting surface, said wheel means comprising a wheel member, caster means mounting the wheel member on the frame unit for rotation about a horizontal axis and for caster movement about a swivel axis, and brake means mounted for movement with said wheel member about said swivel axis, said brake means having a brake surface spaced vertically from the lowest point of the wheel member, whereby when said wheel member drops into a recess in a supporting surface, said braked surface engages the supporting surface to resist movement of the frame unit in directions parallel to such supporting surface, said brake means being positioned to develop a resultant brake force acting between the frame unit and a supporting surface for the wheel means which passes through said swivel axis, whereby the resultant brake force does not act to urge the wheel unit about the swivel axis.

18. The structure defined in claim 17 wherein the brake surface comprises a separate brake surface portion disposed on each side of the lower part of said wheel member.

19. The structure defined in claim 17 in combination with a supporting unit providing said supporting surface, said wheel member having circumferential endless spaced similar ribs concentric about said horizontal axis, adjacent ribs having an endless groove therebetween, said brake surface being spaced from the lowest point on said ribs by a distance less than the depth of said groove, said ribs being spaced by the same distance as said first cleats, and being proportioned to intermesh with said cleats to drop the brake surface into braking engagement with the upper surfaces of said first cleats.

20. A vehicle adapted to be carried by a conveyor having a slotted surface, the vehicle having wheels on which the vehicle can roll when off said surface, at least one of the wheels having a configuration that registers with said surface whereby when the vehicle is on the conveyor said one of the wheels can drop into said surface, the vehicle having adjacent said one of the wheels a brake pad engageable with said surface when said one of the wheels drops into said surface whereby the brake pad carries at least part of the weight of the vehicle and thus brakes the vehicle with respect to the conveyor.

21. A vehicle as claimed in claim 20, wherein the brake pad is substantially in a vertical plane containing the axis of said one of the wheels.

22. A vehicle adapted to be carried by an inclined conveyor having a ridged surface consisting of a plurality of equally spaced apart longitudinal ridges, the vehicle having wheels on which the vehicle can roll when off said surface, the wheels having in their peripheries circumferentially extending grooves that mate with the ridges of said surface whereby when the vehicle is rolled onto the conveyor the wheels can drop into said surface, the vehicle having brake pad means at such a height as to engage said surface when a wheel drops into said surface whereby the brake pad means carry at least part of the weight of the vehicle and thus brake the vehicle with respect to the conveyor.

23. A vehicle as claimed in claim 22, wherein when the wheels rest on a plane surface the height of the brake pad means above the plane surface is less than the depth of the grooves.

24. A vehicle adapted to be carried by an inclined conveyor having a ridged surface consisting of a plurality of equally spaced apart longitudinal ridges separated by grooves, the vehicle having wheels on which the vehicle can roll when off said surface, the wheels having in their peripheries circumferentially extending grooves and ridges that mate with the ridges and grooves of said surface whereby when the vehicle is rolled onto the conveyor the wheels can drop into said surface, the vehicle having adjacent each wheel a brake pad fixed at such a height on the vehicle that it does not impede rolling the vehicle when off said surface but that it engages said surface when the adjacent wheel drops into said surface whereby part of the weight of the vehicle is transferred to said surface through the pad and the vehicle is braked with respect to the conveyor.

25. An automatic brake system for a wheeled vehicle, comprising a ridged surface consisting of equally spaced parallel ridges on which the vehicle is to be braked, at least one of the wheels of the vehicle being grooved in its periphery to mate with the ridges, and a brake pad fixed in height relative to the body of the vehicle in proximity to said grooved wheel, the pad having a downwardly facing friction surface, the brake pad having running clearance from a smooth plane surface on which the vehicle usually runs, but its height being such that when said grooved wheel mates with the ridged surface the brake pad engages the ridged surface and at least some of the weight of the vehicle is transferred to the ridged surface through the friction surface of the brake pad, thus effectively braking the vehicle when it is on the ridged surface.

26. A system as claimed in claim 25, wherein the ridged surface is the surface of an inclined conveyor belt and the wheeled vehicle is a push cart.

27. A system as claimed in claim 26, wherein the ridges of the conveyor belt pass between fingers of a comb plate whereby said grooved wheel can ride up on the comb plate and off the belt.

References Cited by the Examiner

UNITED STATES PATENTS

| | | | |
|---|---|---|---|
| 2,596,686 | 5/1952 | Hess | 186—1 |
| 2,609,915 | 9/1952 | De Burgh | 198—41 |
| 2,791,291 | 5/1957 | Giondons | 186—1 |
| 3,146,882 | 9/1964 | Prucha | 198—16 |

EVON C. BLUNK, *Primary Examiner.*

WILLIAM B. LA BORDE, SAMUEL F. COLEMAN,
*Examiners.*